(12) United States Patent
Briois

(10) Patent No.: US 10,899,876 B2
(45) Date of Patent: Jan. 26, 2021

(54) PROCESS FOR PRODUCING A BIO-BASED POLYETHYLENE TEREPHTHALATE (PET) POLYMER, ENTIRELY FROM BIO-BASED MATERIALS

(71) Applicant: NESTEC S.A., Vevey (CH)

(72) Inventor: Jean-Francois Briois, Vittel (FR)

(73) Assignee: Societe des Produits Nestle S.A., Vevey (CH)

( * ) Notice: Subject to any disclaimer, the term of this patent is extended or adjusted under 35 U.S.C. 154(b) by 36 days.

(21) Appl. No.: 16/327,924

(22) PCT Filed: Aug. 29, 2017

(86) PCT No.: PCT/EP2017/071635
§ 371 (c)(1),
(2) Date: Feb. 25, 2019

(87) PCT Pub. No.: WO2018/041818
PCT Pub. Date: Mar. 8, 2018

(65) Prior Publication Data
US 2019/0185617 A1 Jun. 20, 2019

(30) Foreign Application Priority Data
Sep. 1, 2016 (EP) .................................. 16186906

(51) Int. Cl.
C08G 63/183 (2006.01)
C08G 63/78 (2006.01)

(52) U.S. Cl.
CPC ........... *C08G 63/183* (2013.01); *C08G 63/78* (2013.01)

(58) Field of Classification Search
None
See application file for complete search history.

(56) References Cited

FOREIGN PATENT DOCUMENTS

| CN | 102190782 | 9/2011 |
|---|---|---|
| WO | 9954533 | 10/1999 |
| WO | 2013034743 | 3/2013 |
| WO | 2014144843 | 9/2014 |
| WO | 2016140901 | 9/2016 |
| WO | 2017098296 | 6/2017 |

*Primary Examiner* — Terressa Boykin
(74) *Attorney, Agent, or Firm* — K&L Gates LLP

(57) ABSTRACT

The invention relates to a process for producing a bio-based polyethylene terephthalate (PET) polymer, from at least one terephthalate compound obtained from at least one bio-based material, and at least one monoethylene glycol compound obtained from at least one bio-based material, Said process comprising the polymerization of the terephthalate compound and of the monoethylene glycol compound in the presence of at least one crystallization retarding compound, Said process being characterized in that the crystallization retarding compound is obtained from at least one bio-based material. The invention also relates to a bio-based PET polymer obtained by said process. Preferably, the process further comprises processing the bio-based PET polymer into a bio-based product such as a bio-based container or a bio-based packaging. The invention also relates to said bio-based product.

20 Claims, No Drawings

PROCESS FOR PRODUCING A BIO-BASED POLYETHYLENE TEREPHTHALATE (PET) POLYMER, ENTIRELY FROM BIO-BASED MATERIALS

CROSS REFERENCE TO RELATED APPLICATIONS

The present application is a National Stage of International Application No. PCT/EP2017/071635, filed on Aug. 29, 2017, which claims priority to European Application No. 16186906.0, filed on Sep. 1, 2016, the entire contents of which are being incorporated herein by reference.

TECHNICAL FIELD

This invention relates to a process for producing a bio-based polyethylene terephthalate (PET) polymer, entirely from bio-based materials.

BACKGROUND OF THE INVENTION

Polyethylene terephthalate (or poly(ethylene terephthalate) or PET; IUPAC name poly(ethylbenzene-1,4-dicarboxylate)) is the most common thermoplastic polymer resin of the polyester family and is used in fibers for clothing, containers for liquids and foods, thermoforming for manufacturing, and in combination with glass fiber for engineering resins. In particular, PET is widely used as a raw material for making packaging articles in part due to its excellent combination of clarity, mechanical, and gas barrier properties. Examples of PET products include, but are not limited to, bottles and containers for packaging products, soft drinks, alcoholic beverages, detergents, cosmetics, pharmaceutical products and edible oils.

PET polymer consists of polymerized units of the monomer ethylene terephthalate, with repeating —(—O—CO—$C_6H_4$—CO—O—$(CH_2)_2$—)— units.

Depending on its processing and thermal history, polyethylene terephthalate may exist both as an amorphous (transparent) and as a semi-crystalline polymer. The polymer unit based on bis(2-hydroxyethyl) terephthalate can be synthesized by esterification reaction between terephthalic acid and ethylene glycol, or by transesterification reaction between ethylene glycol and dimethyl terephthalate. Polymerization through a polycondensation reaction of the monomers is carried out immediately after esterification/transesterification.

In addition to pure (homopolymer) PET, PET modified by copolymerization is also available. In some cases, the modified properties of copolymer are more desirable for a particular application. For example, cyclohexanedimethanol (CHDM) can be added to the polymer backbone partly in place of ethylene glycol, or terephthalic acid can be partly replaced by isophtalic acid. This interferes with crystallization and lowers the polymer's melting temperature.

Consequently, the use of small amounts of isophtalic acid, CHDM, diethylene glycol or other comonomers can be useful for example for the manufacture of PET bottles. Since crystallization is slowed but not prevented entirely, these comonomers are usually named crystallization retarding compounds. As a result, bottles are obtainable via stretch blow molding, which are both clear and crystalline enough to be an adequate barrier to aromas and even gases, such as carbon dioxide in carbonated beverages.

Due to the decline of world oil reserve and to the variation in the oil prices, but also due to the need to improve the carbon footprint material (via greenhouse emissions), many researches have been made for completely or partially replacing petrochemically-derived raw materials by raw material coming from biologically based materials (or bio-materials). In this context, patent application WO 2009/120457 from The Coca-Cola Company describes the use of at least one diacid compound and of at least one diol compound, both obtained from at least one bio-based material, in order to provide a bio-based polyethylene terephthalate (PET) polymer. No use of a crystallization retarding compound is described.

Patent application WO 2013/034743 from SAEME describes the use of a bio-based polyethylene terephthalate (PET) polymer which comprises in addition at least one crystallization retarding compound such as diacid compounds or diols compounds, preferably isophthalic acid (IPA) and/or cyclohexanedimethanol (CHDM). Said crystallization retarding compound is added before the copolymerization of the bio-based PET polymer.

However, such crystallization retarding compounds are not bio-based compounds. Thus, the bio-based PET polymer manufactured according to patent application WO 2013/034743 cannot be more than 97 wt % bio-based.

Therefore there is a need for producing a bio-based PET polymer entirely obtained from bio-based materials.

SUMMARY OF THE INVENTION

Accordingly, in a first aspect of the invention, there is provided a process for producing a bio-based polyethylene terephthalate (PET) polymer, from at least one terephthalate compound obtained from at least one bio-based material, and at least one monoethylene glycol compound and obtained from at least one bio-based material, Said process comprising the copolymerization of the terephthalate compound and of the monoethylene glycol compound in the presence of at least one crystallization retarding compound, Said process being characterized in that the crystallization retarding compound is obtained from at least one bio-based material.

In a second aspect of the invention, there is provided a bio-based polyethylene terephthalate (PET) polymer obtained according to the process of the invention.

This bio-based PET polymer may be processed into a product selected from PET granules, a PET resin, a PET fiber (also referred to as PET filament), a PET preform, a PET packaging and combinations thereof, as it is known to the skilled person.

DETAILED DESCRIPTION OF THE INVENTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention, and do not limit the scope of the invention when taken into consideration with the claims and the following detailed description.

In the present description, the following words are given a definition that should be taken into account when reading and interpreting the description, examples and claims.

As used herein, the following terms have the following meanings.

The term "bio-based material" means biologically based materials, typically obtained from vegetal origin. Said material is also referred to as "bio-sourced from renewable resource" or "renewable material" or "material from vegetal origin". In other words, the term "bio-based material" refers to organic materials in which the carbon comes from non-fossil biological sources.

A "bio-based PET" is, according to the invention, a PET polymer in which the monomer units (or building blocks), either issued from ethylene terephthalate or from the crystallization retarding compound, are bio-based.

As it is usual in the art, the term "polyethylene terephthalate" or "PET" designates here the (homo)polymers as well as, by extension, the copolymers.

The term "bio-based product" means any thermoplastic product made from bio-based PET". For example bio-based product may designate PET granules, PET resin, PET fiber, PET preform, PET packaging, PET container etc.

As used in this specification, the words "comprises", "comprising", and similar words, are not to be interpreted in an exclusive or exhaustive sense. In other words, they are intended to mean "including", but not limited to.

All percentages are by weight unless otherwise stated.

Any reference to prior art documents in this specification is not to be considered an admission that such prior art is known or forms part of the common general knowledge in the field.

PET is a polymer made of polymerized units of the monomer ethylene terephthalate, with repeating —(—O—CO—$C_6H_4$—CO—O—$(CH_2)_2$—)— units, as well as small amounts of other monomeric units issued from the crystallization retarding compound. By "small amounts", it is meant here that the crystallization retarding compound is in an amount from 0.05 to 7% mol, preferably from 0.1 to 4% mol, with respect to the bio-based PET polymer.

This is calculated on a molar substitution by said crystallization retarding compound.

The units corresponding to the crystallization retarding compounds are based either on the total number of moles of diacid units contained in the bio-PET, or on the total number of diol units contained in the bio-PET, depending on the chemical formula of said crystallization retarding compound.

The terephthalate compound may be produced from the bio-based material using methods including but not limited to fast pyrolysis, acid hydrolysis, enzymatic hydrolysis, microbial degradation, mycological degradation, and hydrogenolysis. The terephthalate compound obtained from at least one bio-based material preferably consists in a terephthalate compound.

Usually, the terephthalate compound is selected from terephthalic acid, dimethyl terephthalate and a combination thereof. More preferably, the terephthalate compound is terephthalic acid.

Obtaining a bio-based terephthalate compound from a bio-based material is known to the skilled person. For example, terephthalic acid can be obtained by:
  converting carene extracted from an oily wood feedstock to para-cymene and meta-cymene by dehydrogenation and aromatization, and oxidizing para-cymene to terephthalic acid and isophthalic acid; or
  producing muconic acid from biomass by a microbiological process involving micro-organisms, and then conducting the muconic acid into the terephthalic acid; or
  Extracting limonene from a bio-based material which is a citrus fruit and/or a woody plant, converting said limonene to at least one terpene, or extracting terpene from bio-based material such as lemon, followed by converting terpene to para-cymene and oxidizing the para-cymene to terephthalic acid; or
  Extracting hydroxymethylfurfural from a bio-based material which is corn syrup and/or sugars and/or cellulose, converting said hydroxymethylfurfural to hydroxymethylbenzaldehyde in a two-step process and oxidizing the hydroxymethylbenzaldehyde to terephthalic acid; or
  Converting a biomass to a sugar comprising fructose and/or sucrose, converting the sugar to 5-hydroxymethylfurfural, oxidizing the 5-hydroxyethylfurfural to 2,5-furandicarboxylate which is reacted with ethylene (obtained from bio-materials) in the presence of a solvent to produce a bicyclic ether which is further dehydrated to terephthalic acid; or
  Converting a biomass to a sugar comprising fructose and/or glucose, converting the sugar to 5-hydroxymethylfurfural, hydrogenating the 5-hydroxyethylfurfural to 2,5-dimethylfuran which is reacted under cycloaddition reaction conditions and in the presence of a catalyst to produce para-xylene, oxidizing the para-xylene with oxygen to terephthalic acid; or
  Obtaining syngas from a bio-based material (such as sugar cane, corn or woody biomass) which is further converted to para-xylene, and oxidizing para-xylene to terephthalic acid; or
  Obtaining isobutanol from biomass by fermentation, converting isobutanol to isobutene, converting isobutene to isooctane by oligomerization, and converting para-xylene to terephthalic acid.

The bio-based terephthalate compound can also be obtained by chemical recycling.

The monoethylene glycol (also called ethylene glycol) compound may be produced from the bio-based material using methods including but not limited to fast pyrolysis, acid hydrolysis, enzymatic hydrolysis, microbial degradation, mycological degradation, and hydrogenolysis. The monoethylene glycol compound obtained from at least one bio-based material preferably consists in monoethylene glycol.

Obtaining a bio-based ethylene glycol from a bio-based material is known to the skilled person. For example, ethylene glycol can be obtained by:
  Obtaining syngas from a bio-based material which is further converted to ethanol, dehydrating ethanol to ethylene, oxidizing ethylene to ethylene oxide, and converting ethylene oxide to ethylene glycol; or
  Obtaining a mixture comprising ethylene glycol and at least one other glycol (such as butanediols, propanediols and glycerols, excluding the ethylene glycol) from sugar or derivatives from at least one bio-based material, isolating the ethylene glycol from the mixture, and possibly repeating this step to obtain higher yields of ethylene glycol.

The bio-based monoethylene glycol can also be obtained by chemical recycling.

The process for producing a bio-based polyethylene terephthalate (PET) polymer according to the invention, comprises the copolymerization of the terephthalate compound and of the monoethylene glycol compound in the presence of at least one bio-based crystallization retarding compound.

The process according to the invention is advantageously carried out in industrial facilities already used for processing PET polymer from fossil or partly fossil origin. The only difference is that all the starting materials are bio-based compounds. The skilled person is able to implement the process according to the invention in view of said outstanding processes. The main steps of the process for forming a PET polymer according to the invention are detailed below.

As it is known in the art and for example disclosed in patent application WO 2013/034743, the copolymerization of the terephthalate compound and of the monoethylene glycol compound in the presence of at least one crystallization retarding compound can comprise a melt polymerization step, followed by a polycondensation step.

In the melt polymerization step, polyethylene terephthalate is usually produced from ethylene glycol and dimethyl terephthalate or terephthalic acid. The former is a transesterification reaction, whereas the latter is an esterification reaction.

In dimethyl terephthalate process, this compound and excess ethylene glycol are usually reacted in the presence of at least one crystallization retarding compound at atmospheric pressure or a higher pressure and at a temperature of 150-250° C. with a basic catalyst such as manganese acetate. Methanol is removed by distillation to drive the reaction forward. Excess ethylene glycol is removed after the reaction (for example it is distilled off at higher temperature with the aid of vacuum).

In the terephthalic acid process, esterification of ethylene glycol and terephthalic acid is usually conducted in the presence of at least one crystallization retarding compound directly at moderate pressure (27-55 kPa) and high temperature (150-280° C.). Water is eliminated in the reaction, and it is also continuously removed by distillation.

The polycondensation step is typically carried out in the presence of a catalyst. Said catalyst is usually chosen from antimony, germanium of titanium. The polycondensation usually comprises a heating under stirring at a temperature of 245-280° C. and at a pressure of 10-200 Pa.

The thus obtained bio-based PET polymer is usually poured in to a die in order to obtain laces. After cooling, the laces are cut up to produce bio-based PET granules. These granules are possibly dried before further processing.

Preferably, the bio-based PET granules are heated in the solid-state polycondensation reaction under vacuum, in an atmosphere or low oxidizing atmosphere, in order to attend the degree of polymerization desired for the patent application.

The invention also relates to a bio-based PET-polymer obtained by the process according to the invention.

The bio-based polyethylene terephthalate polymer preferably comprises from about 25 to about 75, preferably from about 30 to about 70, even more preferably from about 40 to about 65, weight percent of a terephthalate compound and from about 20 to about 50, preferably from about 25 to about 45, even more preferably from about 25 to about 35, weight percent of a diol component.

The granules can be used as starting material for feeding plants for spinning of fibers, for conversion into a packaging, for example for the extrusion of films, for the injection-blow molding of hollow bodies, for the injection-molding or thermoforming of articles having various forms.

Therefore, in a preferred embodiment, the process further comprises processing the bio-based PET polymer into a product selected from PET granules, a PET resin, a PET fiber, a PET preform, a PET packaging, a PET container, and combinations thereof, as it is known in the art. The PET container is preferably a bottle or a cup. The PET packaging is preferably a film, shaped or not. Before this processing, the bio-based PET can be mixed with recycled PET, for example by mixing bio-based PET chips and granules with recycled PET chips and granules, typically mechanically recycled PET chips or granules.

Actually, the PET resin may be further processed into a PET preform which will be later formed into a PET packaging or a PET container, or directly into a PET packaging or a PET container.

The invention also relates to a bio-based PET-product obtained by the process according to the invention.

Usually, the method for producing a bio-based PET packaging or a bio-based container comprises the step of performing a method of preparing in the bio-based PET, and the step of converting the bio-based PET to the bio-based PET packaging or PET container. The container can be for example a bottle or a cup, and the packaging can be a film.

According to the invention, the crystallization retarding compound is generally selected from the group consisting of isosorbide, 1,3-propanediol, 1,4-butanediol, 2,3-butanediol, 1,3-pentanediol, 1,4-pentanediol, 1,5-pentanediol, 2-methyl-1,4-butanediol (2-MBDO), diethylene glycol, triethylene glycol, propylene glycol, catechol, 2,5-dihydroxymethyl tetrahydrofuran, 2,5-bis(hydroxymethyl) furan, fumaric acid, glutaric acid, muconic acid, itaconic acid, succinic acid, adipic acid, malic acid, 2,5-furan dicarboxylic acid and p,p'-biphenyl dicarboxylic acid, and combinations thereof.

According to a preferred embodiment, the crystallization retarding compound is selected from the group consisting of 1,3-pentanediol, 1,4-pentanediol, catechol, 2,5-dihydroxymethyl tetrahydrofuran, 2,5-bis(hydroxymethyl) furan, fumaric acid, muconic acid, itaconic acid, malic acid, 2,5 furan dicarboxylic acid and p,p'-biphenyl dicarboxylic acid, and combinations thereof.

According to another preferred embodiment, the crystallization retarding compound is selected from the group consisting of isosorbide, 1,3-propanediol, 1,4-butanediol, 2,3-butanediol, 1,3-pentanediol, 1,4-pentanediol, 1,5-pentanediol, diethylene glycol, 2,5-furan dicarboxylic acid and p,p'-biphenyl dicarboxylic acid, and combinations thereof.

According to yet another preferred embodiment, the crystallization retarding compound is selected from the group consisting of isosorbide, 2,5-furan dicarboxylic acid, and combinations thereof.

The bio-based material leading to the bio-based crystallization retarding compound is usually selected from the group consisting of sugars, starches, corns, natural fibers, sugarcanes, beets, citrus fruits, woody plants, cellulosic-containing compounds, lignocellulosic-containing compounds, hemicellulosic-containing compounds, oily wood feedstock, polysaccharides such as pectin, chitin, levan, pullulan, and combinations thereof.

The bio-based material leading to the bio-based crystallization retarding compound can preferably and advantageously be obtained from agricultural waste.

Obtaining the bio-based crystallization retarding compound from the bio-based material is for example described in the publication Polymer Chemistry, 2015, 6, 4497-4559 from Furkan H. Isigkor and C. Remzi Becer which is a review entitled "*Lignocellulosic biomass: a sustainable platform for the production of bio-based chemicals and polymer*" in the case where the bio-based material compound is lignocellulosic biomass. Some ways to synthesize these bio-based molecules are described below. However the skilled person is able to synthesize these bio-based crystallization retarding compounds by the use of other ways well known to the art.

Bio-based isosorbide can be produced from glucose, which is itself a degradation product of e.g. starch or cellulose. First, hydrogen is added to glucose, transforming it to sorbitol. Isosorbide is then produced by extracting two water molecules from two sorbitol molecules.

Bio-based 1,3-propanediol (for example commercial product Susterra® from DuPont Tate & Lyle) can be produced from glucose (obtained e.g. from starch or cellulose) or from dextrose extracted from corn by fermenting, separating and refining. It can also be produced via 3-hydroxy-propionic acid which can be obtained through fermentation of sugars by employing genetically modified microorganisms. 3-hydroxy-propionic acid is then used for the production of 1,3-propanediol through a hydrogenation process. Bio-based 1,3-propanediol can also be produced by hydrogenolysis of glycerol (produced by microbial fermentation).

Bio-based 1,4-butanediol can be produced from dextrose. It can also be produced from butane-derived maleic anhydride which is converted to 1,4-butanediol, tetrahydrofuran and gamma butyrolactone in a few stages, including esterification, hydrogenolysis and refining. It can also be produced from bio-based fumaric acid or aspartic acid which is obtained from renewable feedstocks, for example from ammonia and fumaric acid by employing immobilized aspartase from *Escherichia. coli* or suspended cells of *Brevibacterium bravum*. It can also be produced from bio-based succinic acid (as it is done by the company BioAmber).

Bio-based 2,3-butanediol can be produced by fermenting carbon monoxide with a bacterium of the *Clostridium* family (LanzaTech's proprietary microorganism) to make ethanol and 2,3-butanediol as co-products.

Bio-based 1,4-pentanediol can be produced from gamma-valerolactone which is obtained from levulinic acid which is for example produced from lignocellulosic biomass.

Bio-based 1,5-pentanediol can be produced from glutamic acid which is for example produced from lignocellulosic biomass.

Bio-based 2-methyl-1,4-butanediol (2-MBDO) can be obtained through ruthenium-catalyzed hydrogenation of itaconic acid in the presence of triphos ligand at 195° C.

Bio-based ethylene glycol (which synthesis was formerly discussed above), bio-based diethylene glycol and bio-based triethylene glycol are generally obtained from bio-based ethylene. Bio-based ethylene is obtained by dehydration of bio-derived ethanol produced by various companies for example from lignocellulosic biomass resources. Bio-based ethylene is oxidized to ethylene oxide, which is then hydrolysed to produce ethylene glycol by non-catalytic liquid-phase hydration. Diethylene glycol and triethylene glycol are co-products formed together with ethylene glycol. In order to ensure higher ethylene glycol selectivities (roughly 90%), a large excess of water (20-25 mol water per mol ethylene oxide) can be used. Bio-based ethylene glycol can also be produced by the hydrogenolysis of sorbitol with multifunctional catalysts, or by hydrogenolysis of glycerol. Bio-based propylene glycol can be produced via lactic acid (which is produced via the fermentation of glucose and sucrose by lactic acid bacteria), or by sorbitol hydrogenolysis with multifunctional catalysts (which can also produce glycerol), or hydrogenolysis of glycerol (produced by microbial fermentation).

Bio-based catechol is for example obtained as lignin-derived chemical.

Bio-based 2,5-dihydroxymethyl tetrahydrofuran (or 2,5-bis(hydroxymethyl tetrahydrofuran)) and/or bio-based 2,5-bis(hydroxymethyl) furan can be obtained by selective reduction of bio-based 2,5-furan dicarboxylic acid.

Bio-based fumaric acid can be the commercial product of the company Myriant. It can also be produced from $C_5$-$C_6$ sugars obtained from lignocellulosic biomass.

Bio-based glutaric acid can be produced from glutamic acid which is for example produced from lignocellulosic biomass, or by degradation of L-lysine by *Pseudomonas putida* by having 5-aminovaleric acid as intermediate.

Bio-based muconic acid can be the commercial product of the company Myriant. It can also be obtained as lignin-derived chemical via bio-based catechol.

Bio-based itaconic acid can be produced industrially via fermentation of carbohydrates such as glucose by fungi.

Bio-based succinic acid is generally produced via biological, microbial or chemical conversion. It can also be produced from $C_5$-$C_6$ sugars obtained from lignocellulosic biomass. It can be the commercial product of the company Myriant.

Bio-based adipic acid can be produced from levulinic acid which is for example produced from lignocellulosic biomass.

Bio-based malic acid can be produced from $C_5$-$C_6$ sugars obtained from lignocellulosic biomass.

Bio-based 2,5-furan dicarboxylic acid can be produced from $C_5$-$C_6$ sugars obtained from lignocellulosic biomass.

Bio-based p,p'-biphenyl dicarboxylic acid can be obtained from itaconic acid via 2-methylsuccinic acid and 2-methyl-1,4-butanediol.

It is known in the art that carbon-14 (C-14), which has a high life of about 5,700 years, is found in bio-based materials but not in fossil fuels. Therefore, the detection of C-14 is indicative of a bio-based material. C-14 levels can be determined by measuring its decay process (disintegrations per minute per gram carbon or dpm/gC) through liquid scintillation counting. In one embodiment of the present invention, the bio-based PET polymer comprises at least about 0.1 dpm/gC (disintegrations per minute per gram carbon) of C-14.

Other ingredients may be added to the value-based PET polymer. Those of ordinary skill in the art would really be able to select the suitable ingredient(s) to add to the bio-based PET polymer to improve the desired properties, which may depend on the type of application intended. In a particular embodiment, the bio-based PET polymer may further comprise a supplementary component selected from at least one coloring agent, at least one fast reheat additive, at least one gas barrier additive, at least one UV blocking additive, and a combination thereof.

Bio-based PET polymers may be used to from bio-based resins, which may be further processed into bio-based containers using methods including, but not limited to, injection molding and stretch blow molding.

Other standard ingredients known to the skilled person for their use in formulating a bio-based PET polymer may also be present in the starting mixture of the invention.

Although the invention has been described, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A process for producing a bio-based polyethylene terephthalate (PET) polymer, from at least one terephthalate acid compound obtained from at least one bio-based material, and at least one ethylene glycol compound obtained from at least one bio-based material, the process comprising:

polymerization through esterification of the terephthalate acid compound and of the ethylene glycol compound in the presence of isosorbide obtained from at least one bio-based material, the esterification is performed at a pressure of 27-55 kPa and a temperature of 150-280° Celsius.

2. The process according to claim 1, wherein the esterification is conducted in the presence of an additional crystallization retarding compound obtained from at least one bio-based material, the additional crystallization retarding compound is selected from the group consisting of 1,3 propanediol, 1,4 butanediol, 2,3 butanediol, 1,3 pentanediol, 1,4 pentanediol, 1,5 pentanediol, 2 methyl 1,4 butanediol (2 MBDO), diethylene glycol, triethylene glycol, propylene glycol, catechol, 2,5 dihydroxymethyl tetrahydrofuran, 2,5 bis(hydroxymethyl) furan, fumaric acid, glutaric acid, muconic acid, itaconic acid, succinic acid, adipic acid, malic acid, 2,5 furan dicarboxylic acid and p,p' biphenyl dicarboxylic acid, and combinations thereof.

3. The process according to claim 1, wherein the esterification is conducted in the presence of an additional crystallization retarding compound obtained from at least one bio-based material, the additional crystallization retarding compound is selected from the group consisting of 1,3 pentanediol, 1,4 pentanediol, catechol, 2,5 dihydroxymethyl tetrahydrofuran, 2,5 bis(hydroxymethyl) furan, fumaric acid, muconic acid, itaconic acid, malic acid, 2,5 furan dicarboxylic acid and p,p'-biphenyl dicarboxylic acid, and combinations thereof.

4. The process according to claim 1, wherein the esterification is conducted in the presence of an additional crystallization retarding compound obtained from at least one bio-based material, the additional crystallization retarding compound is selected from the group consisting of 1,3-propanediol, 1,4-butanediol, 2,3 butanediol, 1,3-pentanediol, 1,4-pentanediol, 1,5-pentanediol, diethylene glycol, 2,5-furan dicarboxylic acid and p,p'-biphenyl dicarboxylic acid, and combinations thereof.

5. The process according to claim 1, wherein the esterification is conducted in the presence of an additional crystallization retarding compound obtained from at least one bio-based material, the additional crystallization retarding compound is 2,5-furan dicarboxylic acid.

6. The process according to claim 1, wherein the isosorbide is present in an amount from 0.05 to 7% mol with respect to the bio-based PET polymer.

7. The process according to claim 1, wherein the bio-based material leading to the isosorbide is selected from the group consisting of sugars, starches, corns, natural fibers, sugarcanes, beets, citrus fruits, woody plants, cellulosic-containing compounds, lignocellulosic-containing compounds, hemicellulosic-containing compounds, oily wood feedstock, polysaccharides such as pectin, chitin, levan, pullulan, and combinations thereof.

8. The process according to claim 1, wherein the process further comprises processing the bio-based PET polymer into a product selected from the group consisting of PET granules, a PET resin, a PET fiber, a PET preform, a PET packaging, a PET container, and combinations thereof.

9. A bio-based PET polymer obtained by the process according to claim 1.

10. A bio-based PET product obtained by the process according to claim 8.

11. The process according to claim 1, wherein the terephthalate acid compound is 25 to 75 weight percent of the bio-based polyethylene terephthalate polymer and a diol component is 20 to 50 weight percent of the bio-based polyethylene terephthalate polymer.

12. The process according to claim 1, wherein the bio-based PET polymer comprises at least about 0.1 dpm/gC of C-14.

13. The process according to claim 1, wherein the bio-based PET polymer further comprises a supplementary component selected from the group consisting of at least one coloring agent, at least one fast reheat additive, at least one gas barrier additive, at least one UV blocking additive, and a combination thereof.

14. The process according to claim 7, wherein the bio-based material leading to the bio-based crystallization is obtained from agricultural waste.

15. The process according to claim 8, wherein the PET container is a product selected from a bottle, a cup, and combinations thereof.

16. The process according to claim 8, wherein PET packaging is a film.

17. The process according to claim 8, further comprising shaping the PET packaging.

18. The process according to claim 8, further comprising mixing the bio-based PET with recycled PET, wherein bio-based PET chips and granules are mixed with recycled PET chips and granules.

19. The process according to claim 8, further comprising heating the bio-based PET granules in a solid-state polycondensation reaction under vacuum, in an atmosphere, wherein the atmosphere is a low oxidizing atmosphere.

20. The process according to claim 8, further comprising processing the PET resin into a PET preform, wherein the PET preform forms at least one of the PET packaging and the PET container.

* * * * *